United States Patent [19]

Manian

[11] Patent Number: 5,172,419
[45] Date of Patent: Dec. 15, 1992

[54] MEDICAL IMAGE PROCESSING SYSTEM

[75] Inventor: Bala S. Manian, Saratoga, Calif.

[73] Assignee: Lumisys, Inc., Sunnyvale, Calif.

[21] Appl. No.: 665,401

[22] Filed: Mar. 5, 1991

[51] Int. Cl.[5] ............................................. G06K 9/00
[52] U.S. Cl. .................................. 382/6; 364/413.13; 364/413.19; 382/54
[58] Field of Search ............... 382/6, 54, 44; 358/111; 364/413.13, 413.15, 413.19, 413.22, 413.24, 413.14, 413.16

[56] References Cited

U.S. PATENT DOCUMENTS

| | | | |
|---|---|---|---|
| 4,302,672 | 11/1981 | Kato et al. | 382/6 |
| 4,315,318 | 2/1982 | Kato et al. | 364/515 |
| 4,317,179 | 2/1982 | Kato et al. | 364/515 |
| 4,323,973 | 4/1982 | Greenfield | 358/111 |
| 4,340,911 | 7/1982 | Kato et al. | 358/280 |
| 4,346,409 | 8/1982 | Ishida et al. | 358/280 |
| 4,590,582 | 5/1986 | Umemura | 382/6 |
| 4,641,242 | 2/1987 | Kimura | 382/6 |
| 4,845,762 | 7/1989 | Higashi et al. | 382/54 |
| 4,955,067 | 9/1990 | Shimura | 382/6 |
| 5,046,118 | 9/1991 | Ajewole et al. | 382/6 |

OTHER PUBLICATIONS

Hori et al., "Unified Digital Image Display and Processing System", SPIE vol. 314 Digital Radiography, pp. 340-346, 1981.

*Primary Examiner*—Joseph Mancuso
*Attorney, Agent, or Firm*—Schneck & McHugh

[57] ABSTRACT

A system and method for processing images viewed on radiographic film. Such images include mammograms, CAT scans, or other standard x-ray type images. The system includes a scanning laser film digitizer for reading the optical density of pixels in an original film image; a controller which analyzes the image data based on input film type and scanned optical density in order to compute an exposure correction factor which enhances the original image quality; and a laser film writer which creates a new copy of the original data in the improved form. The system is capable of writing several proportional non-overlapping images on a single sheet of film. This feature facilitates diagnostic evaluation of related subject matter such as multiple angle views of an injury, simultaneous views of right and left side mammograms, or several CAT scans on a single exposure. The system uses a look-up table to store and access optical density vs. exposure characteristics for several types of radiographic film. This exposure data is used in image processing functions. The look-up table information is also used in the copy writing procedure to insure the correct exposure range is used for a given film type.

12 Claims, 4 Drawing Sheets

MEDICAL IMAGE PROCESSING SYSTEM

DESCRIPTION

1. Technical Field

This invention relates to digitizing film images, acquiring or storing their digital representation, and subsequently recording copies of these images in a suitable format for use in medical or material flaw diagnoses.

2. Background Art

Medical images of the body of a human or other objects are conventionally initially made using X-ray or other high contrast film and are stored for subsequent examination. Although the subsequent examination is usually performed using the original films directly, these images may be stored and called up by other means as well. In U.S. Pat. Nos. 4,315,318 and 4,317,179, Kato et al. disclose method and apparatus for processing a medical image in a radiation image recording system in which the output signal is a linear combination of (1) a signal representing the original film image and (2) an "un-sharp" mask signal corresponding to scanning of the original image at a very low spatial frequency which is representative for the region of the original image to be scanned and/or displayed by the system. This approach emphasizes the representative low frequency variations in the particular region of the image to be scanned and/or displayed.

In the related U.S. Pat. No. 4,346,409, Ishida et al. disclose use of a scanned image formed from a linear combination of (1) the original image and (2) a monotonically increasing function of the one dimensional difference between the original image and the unsharp masked image used by Kato et al. in the aforementioned patents.

Kato et al., in U.S. Pat. No. 4,340,911, discloses use of a mammogram copying and display system in which the original mammogram image is scanned and an image gradation characterization is determined. The image gradation is used to set the light level for display and/or copying at a relatively low level to increase the contrast in the versions of the image that are of most interest.

These systems appear to allow display of at most one medical image at a time. Often, medical personnel wish to display two or more medical images simultaneously for comparison purposes.

An object of the invention is to provide a relatively compact radiographic image acquisition, storage and display unit in which adjustments can be made to improve image density, and wherein two or more of the stored medical or other diagnostic test images may be called up for display simultaneously and with alterable image sizes.

Another object is to provide a system in which wrong exposure of x-ray film does not require another exposure to be made.

A further object is to provide a system and method of reproducing an image on another film type from that in which the original image was taken.

DISCLOSURE OF THE INVENTION

The objects are met by a system that includes a digital film densitometer, a controller with a storage device, a look-up table, an image processor and a film recorder. The densitometer acquires a radiographic image, scans the image, measures the optical density of individual pixels that make up the image, and produces an image output signal that is a digital representation of the optical density of the individual pixels. The controller is connected to an image storage means and to the densitometer for mapping a digital representation of the pixels into a pattern of transformed pixels that has controllably different optical characteristics than the original radiographic image. The image quality adjustments are made by the image processor in concert with film response reference data accessed from the look-up table. The reference data stored in the look-up table comprises optical density vs. exposure data for radiographic films. The controller also has controller output means for producing a second output signal that is a digital representation of the optical density of the transformed pixels. The apparatus also includes a film recorder having support means for supporting unexposed film and beam scanner means connected to the controller for exposing the film, using a scanning beam that is modulated by the second output signal. The system can produce multiple images on a single film as well as re-sized and previously stored images.

BEST MODE FOR CARRYING OUT THE INVENTION

Figure 1:
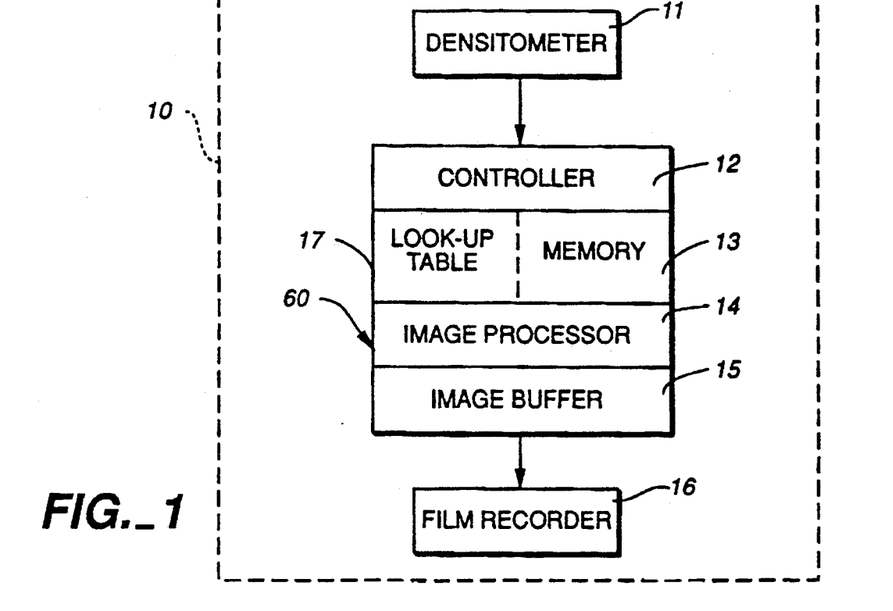
FIG. 1 is a schematic view of a medical image acquisition/display unit constructed according to the invention.

With reference to FIG. 1, a medical film image processing apparatus 10 includes a densitometer 11 for digitizing a medical image with controllable resolution. The densitometer 11 is controlled by a computer 60 that includes a controller 12, a memory module 13 for storing the digital representation of the medical image as well as a look-up table 17 containing exposure characteristics for a number of radiographic type films, an image processor 14 for processing the digital representation of the image to compensate for wrong exposure, improve resolution and contrast, and present the image in a suitable format, and an image buffer 15 to aid in acquisition and processing of the medical image. The apparatus 10 also includes a film recorder 16 for displaying the stored medical image or images in an adjustable format, including the display of a plurality of the acquired medical images on the same sheet in adjacent positions.

Figure 2:
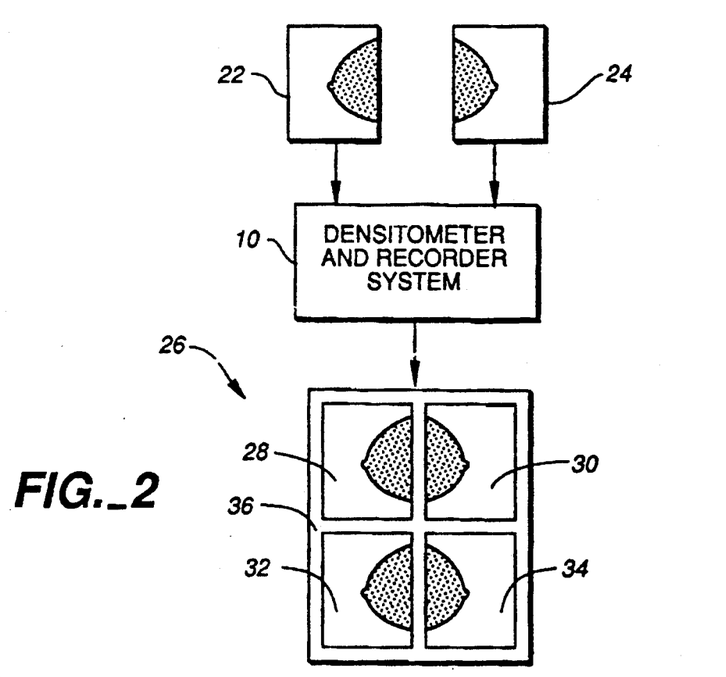
FIG. 2 is a plan view of an image acquisition and re-imaging in accord with the present invention.

With reference to FIG. 2, the medical film image processing apparatus 10 is seen receiving a pair of mammograms 22 and 24 for scanning and recording. The present invention attempts to remove human error and reduce the number and effect of processing variables currently inherent to radiography through image processing. It then rewrites the stored images in a user selected format. As improper exposure accounts for a majority of radiographic image analysis problems, generating a properly exposed image normally affords viable diagnostic data, and further image manipulation becomes unnecessary. A system that corrects exposures in the copying process can be used to take an initial image with a radiation level that underexposes the film. A patient's radiation exposure is thereby minimized, and subsequent exposure correction in the duplication process insures that a sufficient image is provided to the medical examiner.

Exposure correction also provides cost and material conserving benefits. If a single exposure can be made to suffice, all parties benefit--patient risk is reduced, technician time is optimized, material waste is eliminated, and the expense of each of the aforementioned aspects of radiology is trimmed accordingly.

A digital image storage and reproduction system affords the ability to present imaged information in the most effective manner. This may assume the form of nonoverlapping complimentary images, displayed on a single sheet of film or multiple images, of the same subject taken on separate occasions. The latter option allows a clear view of any changes in the subject over any given period of time. For example, the rewritten composite image 26 includes two versions of the left and right mammograms 22 and 24. For example, the upper set of images 28 and 30 may be copies of the images 22 and 24, but somewhat reduced in size. The lower images 32 and 34 have been enhanced by conventional image processing techniques. The two enhanced left and right mammograms 32 and 34 are written on to the same piece of film as the reduced left and right images 28 and 29. An opaque border 36 is formed about the outer periphery of the images, as well as the boundary between images. This may be formed by not exposing the radiographic film so that when it is developed, the border will appear dark. A suitable size for such a film would be the same size as the light table portion of a radiographic viewer. By having dark borders and boundaries, light from the viewer does not pass through the film to the eye of an observer. By use of this technique, the light intensity of the viewer may be increased for examination of details in the radiographic images, without significant amounts of light from peripheral regions affecting the eyesight of a viewer.

Figure 3:
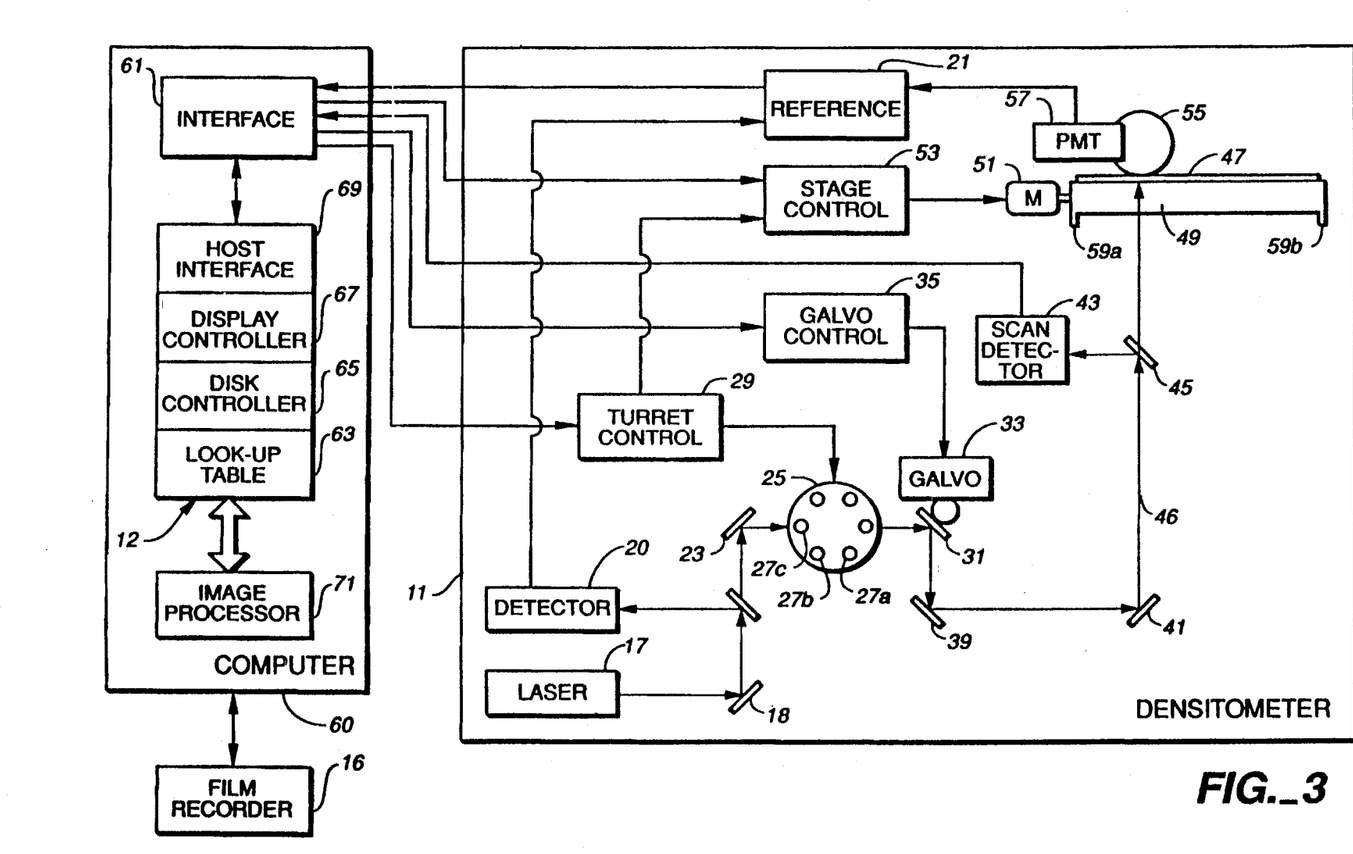
FIG. 3 is a schematic view of the densitometer module according to one embodiment of the invention.

The densitometer module 11, shown in more detail in FIG. 3, includes a laser 17, preferably a 2 mW HeNe laser, that is used as a light beam source for image acquisition. An output light beam from the laser 17 is redirected by a first folding mirror 18 (optional) to a beam splitter 19 that directs a portion of the light beam to a reference beam monitor 20 that is controlled by a reference beam circuit 21, for purposes of monitoring and adjusting the beam power and quality of the output light beam issued by the laser 17. The remainder of the laser beam incident on the beam splitter 19 is passed to a second folding mirror 23 (optional) and then to a variable spot size ("VSS") lens turret 25 that contains a plurality of lenses 27a, 27b, 27c, etc., each of which produces a VSS output light beam of different spot size for purposes of scanning and acquiring a medical image. The VSS lens turret 25 is driven by a VSS lens turret circuit 29.

The VSS lens output beam then passes to a scanner mirror 31 that is driven by a high precision galvanometer 33 and by a galvanometer circuit 35. The scanner mirror 31 is caused to rotate by the galvanometer 33 and thus sweeps the VSS output beam across the plane of a photographic film 47 containing the medical image to be acquired and stored by the system. Optionally, the light beam path includes third and fourth folding mirrors 39 and 41 that further direct this VSS output beam to the plane of the film 47 to be scanned. Before the VSS output beam reaches the film plane, the presence of this output beam is detected by a start of scan detector module 43 that receives a portion of this output beam from a mirror 45 that is positioned partly in the path 46 of the VSS output beam. Receipt of a start of scan signal by the start scan detector module 43 causes the film 47 to begin to move transversely across the direction of the light beam path 46 by means of a movable film stage 49 whose movement is controlled by film stage movement means 51 and an associated film stage control circuit 53. The film stage control circuit receives input signals from the VSS lens turret circuit 29 to vary the transverse rate of movement of the film stage 49 corresponding to a choice of lens spot size at the turret 25. As the film 47 moves transversely on the film stage 49, a light collection cylinder 55 positioned immediately above the film 47 rotates so that the image of the film 47 illuminated by the VSS output beam is received on a light sensitive surface of the cylinder 55. A light collection cylinder circuit 57 or photomultiplier tube transmits input signals to the reference beam circuit 21. Optionally, the film stage 49 may have one or more film stage stops 59a and 59b positioned at each end of the stage to prevent motion of the film stage beyond a certain point.

The circuits 29, 35, and 53 are controlled by a computer 60. Circuits 21 and 43 transmit information signals to computer 60. Computer 60 includes a digital interface 61, a look-up table 63, a disk controller 65, a display controller 67 and a host interface 69. The controllers and interfaces 61, 65, 67 and 69 form controller element 12 in FIG. 1.

Figure 4:
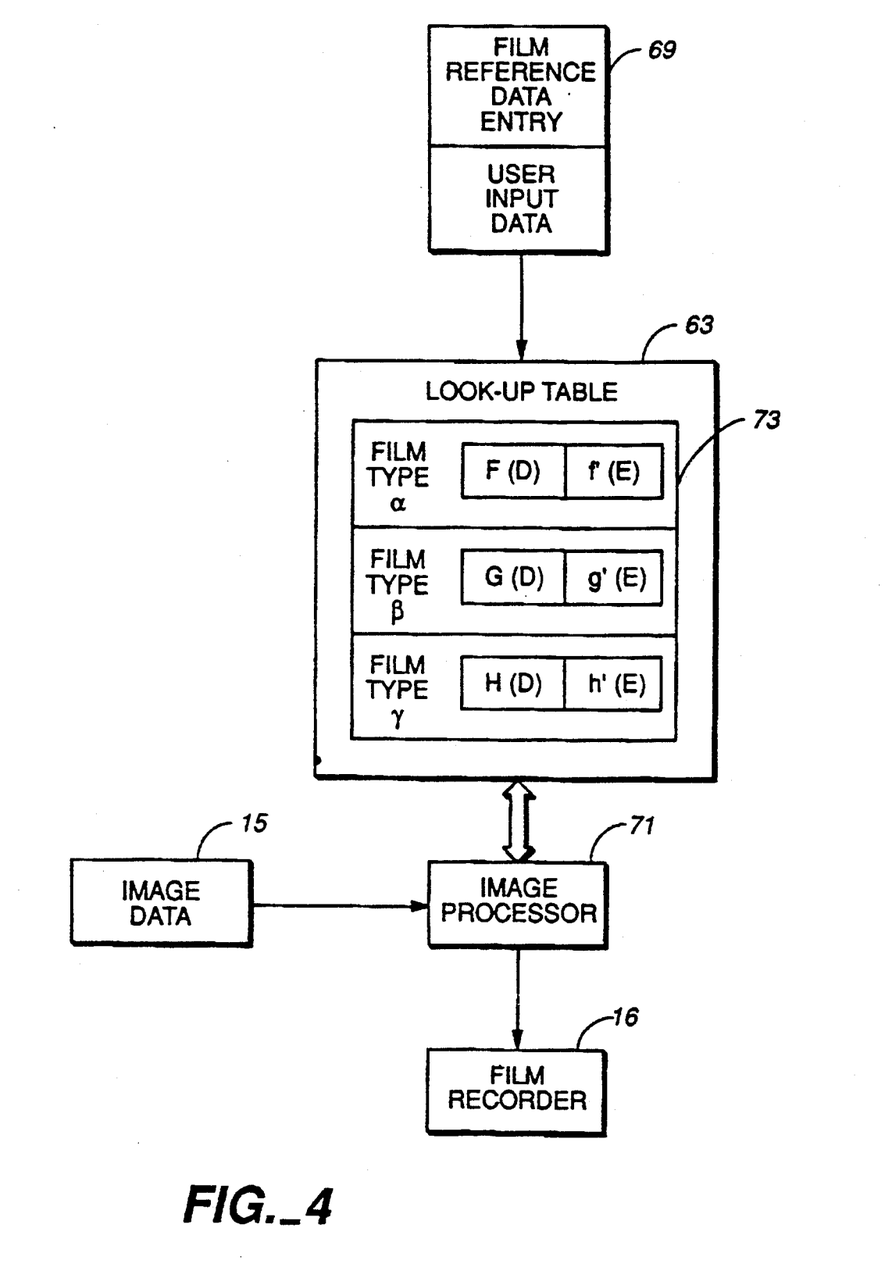
FIG. 4 is a schematic view of a look-up table memory module and processor according to one embodiment of the invention.

The look-up table 63 seen in FIG. 4 is a memory resident feature configured in EPROM in the current embodiment. It is essentially stored reference data in addresses 73 for each film type $\alpha$, $\beta$, $\gamma$, etc., consisting of optical density response as a function of discrete exposure values, each function characteristic of a specific radiographic film such as film sheet 47 being scanned. This data is readily available from the various film manufacturers and can be entered into the look-up table 63 as reference data through host interface 69. The particular film type(s) being used are likewise entered by the user. Typically, the data is stored both as exposure values $F(D)$, $G(D)$, $H(D)$, etc. as a function of discrete optical density values D and as density values $f'(E)$, $g'(E)$, $h'(E)$ as a function of discrete exposure values E or their logarithms log E. To determine either the exposure E used to create a given optical density D in an original image, or the proper exposure to use in a writing procedure, the technician must first enter the type of film $\alpha$, $\beta$, $\gamma$, etc. being used. This information is then used to address the unique density to exposure curve $F(D)$, $G(D)$, $H(D)$, etc. stored on the look-up table or its exposure to density curve $f'(E)$, $g'(E)$, $h'(E)$ etc. corresponding to that type of film. The appropriate data is then outputted to the image processing device 71.

The current embodiment supports a window and level image processing scheme. This provides enhanced image quality via optimization of the film's exposure characteristics in a given image writing procedure. The data from the scanned image is first evaluated in terms of the range and character of optical densities present. By referencing a film's optical density versus exposure behavior $F(D)$, etc. in the look-up table 63, and comparing this information to that of the image data in buffer 15, the exposure E used to produce the scanned image can be determined. Secondly, the range of optical density D is adjusted to simulate the range that would be produced were the exposure made properly. This process allows the radiographic data to be presented in a manner that maximizes the dynamic range of the film, but without artificially affecting the contrast which may distort the information in an undesired manner. The final step assures that the improved data is transferred properly to subsequent hard copies. This entails referring, once again, to the look-up table 63. The processor 71 adjusts the exposure of the copy to suit the particular type of film being used; the look-up table providing reference data f'(E), etc. on the density versus exposure for the film in question, thus matching the exposure to the dynamic range characteristics of the film.

This procedure of exposure from density, correction, then exposure to density enables the technician to worry less about optimizing the exposure in any particular image. The final copy is always adjustable independently of the initial conditions. This feature can be exploited to reduce patient exposure to harmful radiation and minimize lab work. A radiologic image can be taken once, at a lower radiation level, and the underexposed image subsequently improved in the processing of copies. There are several types of low sensitivity, high dynamic range films that support this underexposing procedure: Dupont WDR is a suitable example. The transformed data is then either stored or sent to the writing device.

Figure 5:
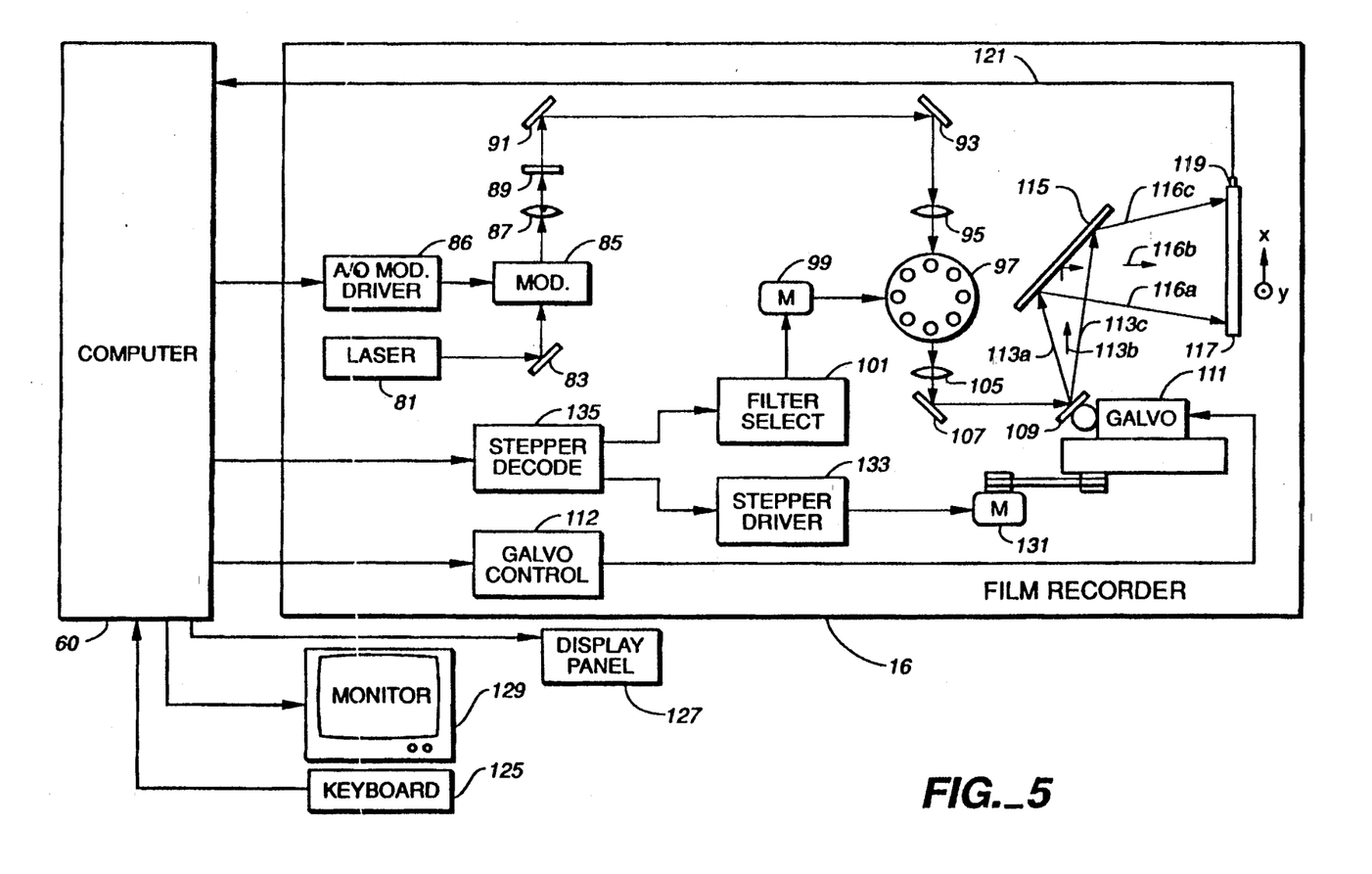
FIG. 5 is a schematic view of a film recorder and display module in one embodiment of the invention.

In FIG. 5 the recorder module 16 includes a laser 81, preferably a 1 mW HeNe laser, as a light source. The output light beam of the laser 81 is received by a first folding mirror 83 (optional) and then by an acousto-optical modulation module 85 that is driven by an a-o modulation driver 86. The light beam that issues from the a-o modulator 85 is received by a first lens 87 (optional) and by a light filter 89 (optional) and passes to second and third folding mirrors 91 and 93 (optional). The light beam then passes through a second lens 95 and is received by a turret density wheel 97, which has a plurality of partly transparent films with densities (for example, 8 to 12 in number) that are user-selectable and is driven by a stepper motor 99 controlled by a filter select stepper motor circuit 101. The light beam then passes through a third lens 105 and is diverted by a fourth folding mirror 107 (optional). The light beam then passes to a scanner mirror 109 that is driven by a galvanometer 111 that is controlled by a galvanometer circuit 112. The action of the galvanometer 111 causes the scanner mirror 109 to oscillate and to thereby change the instantaneous direction 113a–c of the reflected light beam that issues from the mirror 109. This reflected light beam is received by a primary image folding mirror 115 at some position along this mirror, with the position of receipt on the mirror 115 determining the position that the light beam will strike a film, screen or other imaging device 117. For example, if the reflected light beam issuing from the scanner mirror 109 is directed in a first direction 113a, a second direction 113b or a third direction 113c as shown, the light beam reflected from the mirror 113 will travel along the paths indicated as 116a, 116b or 116c, respectively, from the mirror 113 to the film display means 117. The film display means 117 has a sensor 119 associated with it to determine the amount of light that reaches the film display means 117, for possible adjustment of the intensity of the initial light beam emitted by the light source 81. The sensor 119 produces an output signal that is sent via a signal line 121 to the computer 60 for analysis and possible control of the laser 81. A keyboard terminal 125 and a front panel terminal 127 or other input peripheral devices may be provided for the computer 60, and the computer 60 may drive a monitor 129 for display of the image or images acquired at the film display plane 117 by the film recorder module 16.

The laser 81 produces a light beam whose transverse cross-section is a spot of controllable dimension. The scanner mirror 109 scans the image in a first x-direction. For movement in a second or diagonal y-direction, the scanner mirror 109 itself is moved by use of a rotary platform called a turntable (not shown in FIG. 4). Motion of the turntable is controlled by a stepper motor 131 that is controlled by a stepper driver 133 and by a stepper decode circuit 135. Rotation of the scanner 109 plus motion of the turntable allows the entire image to be scanned onto the film display plane 117. The scanner mirror galvanometer 111, galvanometer circuit 112, stepper decoder 135, a-o modulator 86 and monitor 129 receive control or other input signals from the computer 60.

While the embodiment described above is directed principally toward the processing of medical type images, for mammography and the like, it can also be applied to other radiographic diagnostic testing, such as the enhancement of x-ray images of engine parts or the like for materials flaw detection and identification.

I claim:

1. A system for manipulating radiographic type images comprising, digital densitometer means, having a film support, a laser scanning device, a light detector and an analog-to-digital converter with an analog signal input connected to said light detector and a digital signal output, for creating a digital electrical signal, digital words in said digital electrical signal corresponding to the optical density of pixels comprising said radiographic image;

electronic storage means, connected to said densitometer, for receiving and storing said digital signal;

signal processing means connected to said storage means for systematically transforming the digital signal values in order to alter the optical characteristics of said image pixels and hence of said radiographic images, said signal processing means containing evaluation means for receiving original film type inputs, determining original exposure characteristics, and modifying original data to enhance the optical characteristics of subsequent copies by calculating proper exposure per image, regardless of film type said copy is written on; and film writing means, connected to said processor means, having a film support, a modulated scanning laser device, and a data input for writing the transformed pixels to new film, producing a copy of said radiographic image.

2. The system of claim 1 wherien the signal processing means includes look-up table means containing reference numbers for transforming said digital signal values, said numbers corresponding to known exposure vs. optical density characteristics of radiographic type films.

3. A radiographic image formatting and writing apparatus comprising, signal processing means, having a digital signal input, said digital signal input receiving input signals representing optical density information scanned from an underexposed radiographic image on a wide-dynamic-range radiographic film, a data storage register, exposure correcting means receiving said digital input signals from said storage register for adjusting said digital signals to correspond to a uniform increase in the exposure of said image and returning said adjusted digital signals to said storage register, scaling factor table means for accepting said adjusted digital signals from said storage register, and a digital output, each digital word corresponding to the optical density of an individual pixel, for determining appropriate dimensions of said image, mapping the digital information in an areawise manner and outputting mapped, formatted digital information, and modulated laser writing means, having a film support, a digital signal input connected to said signal processing means for receiving said mapped formatted digital information, a laser, means for modulating said laser in response to said digital, and means for scanning a modulated beam from said laser, for scanning said modulated laser across a sheet of unexposed radiographic film in a manner such that the image written on said sheet of film corresponds to the image signals as mapped in said storage means.

4. The apparatus of claim 3 wherein said radiographic image is a mammogram.

5. A radiographic image formatting and writing apparatus comprising:

signal processing means, having a digital signal input, a data storage register, scaling factor table means for accepting digital signals representing pixel information for a plurality of radiographic images, and a digital output, each digital word corresponding to the optical density of an individual pixel, for determining appropriate dimensions of said image, mapping the digital information in an areawise manner, said plurality of radiographic images being mapped in a non-overlapping proportionally scaled manner and outputting said mapped, formatted digital information, and modulated laser writing means, having a film support, a digital signal input connected to said signal processing means for receiving said mapped formatted digital information, a laser, means for modulating said laser in response to said digital, and means for scanning a modulated beam from said laser, for scanning said modulated laser across a sheet of unexposed radiographic film in a manner such that the image written on said sheet of film corresponds to the image signals as mapped in said storage means.

6. The apparatus of claim 5 wherein said plurality of images represents a time base study of a particular subject.

7. A system for manipulating radiographic images comprising, a densitometer means, having a scannable laser device and an optical receiver, for scanning a radiographic film and producing an electric signal corresponding to the optical density of the scanned image, said original radiographic image having been taken underexposed on a low sensitivity, wide dynamic range type radiographic film;

analog-to-digital means for creating a digital signal corresponding to said electric signal;

storage means connected to said densitometer for storing digital signal values received from analog-to-digital converter;

a loop-up table containing exposure versus optical density for a plurality of radiographic film types, including said low sensitivity, wide dynamic range type radiographic film used for said original radiographic image;

a processor connected to said storage means for accessing said stored digital signal values, and connected to said look-up table for determining film exposures values corresponding to said digital signal values, said processor performing a transformation of optical density from the original underexposure to a second corrected exposure to form a transformed digital signal; and film writing means, connected to said processor, for writing said transformed digital signal to new film, each transformed digital signal comprising an optical density value for an image pixel in a film copy.

8. The system of claim 7 wherien said original radiographic image is a mammogram.

9. The system of claim 7 wherein said processor performs a non-linear transformation on digital signal data, converting an original image to an image with transformed optical characteristics on a second film type.

10. A system for manipulating radiographic images comprising, a densitometer means, having a scannable laser device and an optical receiver, for scanning a radiographic film and producing an electric signal corresponding to the optical density of the scanned image;

analog-to-digital means for creating a digital signal corresponding to said electric signal;

storage means connected to said densitometer for storing digital signal values received from analog-to-digital converter, said storage means storing the digital signal as pixels, formatting/mapping them in a representation of an areawise map;

signal processing means, having a digital signal input connected to said storage means, a data storage register, scaling factor table means for accepting digital signals representing pixel information for a plurality of radiographic images, and a digital output, for proportionally scaling the dimensions of the plurality of images to be copied in a manner such that the reduced plural images fit properly on a single film sheet, mapping the scaled digital information in an areawise manner and outputting said mapped, formatted digital information; and film writing means, having a film support, a digital signal input connected to said signal processing means for receiving said mapped, formatted digital information, and a modulated laser scanning device responsive to said digital signal input for writing said images onto a sheet of unexposed radiographic film, wherein the film writing means writes a plurality of non-overlapping proportionally scaled images onto a single sheet of film.

11. A method for producing a mammogram comprising:

exposing a wide dynamic range radiographic film with a radiation source through mammary tissue in a manner whereby an underexposed, though viable image is generated in said film;

scanning said underexposed film image, once developed, in a densitometer whereby a digital signal is generated in accordance with the optical density of individual pixels of the radiographic image;

storing the digital signal;

informing a processing means of the film type used to generate the scanned image;

referring to data stored in a look-up table, said data including an exposure vs. optical density characteristic of a plurality of radiographic film types used in mammography;

comparing digitized scanned data with data in said table to determine the exposure of said image;

calculating a correction value required to maximize the image contrast on a specified radiographic film type;

modifying the recorded pixel data in a data processing device in accordance to exposure correction calculation, producing transformed pixel data corresponding to an image with modified optical characteristics;

mapping the transformed pixels in an areawise pattern within said processing device in a manner which supports writing to a second film of said specified film type; and writing the transformed pixels to said second film which is of the type the exposure correction was calculated for, with a laser which is modulated and scanned across the second film in a manner so as to produce a transformed image, as mapped in the processing device.

12. A method for producing a mammographic study comprising:

(a) exposing a sheet of film with radiation transmitted through mammary tissue in order to produce a radiographic image;

(b) scanning said image to produce a digital signal corresponding to the optical density of individual pixels of which said image is composed;

(c) storing said image as a formatted set of digital values corresponding to a pattern of pixels;

(d) exposing a second radiographic sheet in a similar manner at a later time to produce a second image;

(e) digitizing and storing said second image in a similar fashion as first exposure; and (f) recalling each exposure and mapping pixels whereby each successive image is shown on a single sheet of film in a reduced, non-overlapping manner so as to facilitate a time base study of said mammary tissue.

* * * * *

UNITED STATES PATENT AND TRADEMARK OFFICE
CERTIFICATE OF CORRECTION

PATENT NO. : 5,172,419
DATED : December 15, 1992
INVENTOR(S) : Bala S. Manian It is certified that error appears in the above-identified patent and that said Letters Patent is hereby corrected as shown below:

Claim 3, column 7, line 21, "in response to said digital, and means" should read - -in response to said digital information, and means- -.

Claim 5, column 7, line 48, "in resposne to said digital, and means" should read - -in response to said digital information, and means- -.

Signed and Sealed this

Seventh Day of February, 1995

Attest:

BRUCE LEHMAN

Attesting Officer    Commissioner of Patents and Trademarks